US008482268B2

United States Patent
Yang et al.

(10) Patent No.: US 8,482,268 B2
(45) Date of Patent: Jul. 9, 2013

(54) CORRECTION CIRCUIT OF A SWITCHING-CURRENT SAMPLE FOR POWER CONVERTERS IN BOTH CCM AND DCM OPERATION

(75) Inventors: Ta-Yung Yang, Milpitas, CA (US);
Ying-Chi Chen, Taipei (TW);
Cheng-Sung Chen, Taichung (TW);
Meng-Hsun Yu, Taipei (TW)

(73) Assignee: System General Corporation, Sindian, Taipei County (TW)

( * ) Notice: Subject to any disclaimer, the term of this patent is extended or adjusted under 35 U.S.C. 154(b) by 286 days.

(21) Appl. No.: 13/102,433

(22) Filed: May 6, 2011

(65) Prior Publication Data
US 2012/0069611 A1    Mar. 22, 2012

Related U.S. Application Data

(60) Provisional application No. 61/383,484, filed on Sep. 16, 2010.

(51) Int. Cl.
*G05F 1/40* (2006.01)

(52) U.S. Cl.
USPC .......................................................... 323/283

(58) Field of Classification Search
USPC ................. 323/207, 208, 222, 283, 284, 285, 323/288, 290
See application file for complete search history.

(56) References Cited

U.S. PATENT DOCUMENTS

| | | | | |
|---|---|---|---|---|
| 6,091,233 A | * | 7/2000 | Hwang et al. | 323/222 |
| 7,116,090 B1 | * | 10/2006 | Yang et al. | 323/288 |
| 7,123,494 B2 | * | 10/2006 | Turchi | 363/89 |
| 7,358,706 B2 | * | 4/2008 | Lys | 323/222 |
| 8,274,800 B2 | * | 9/2012 | Uno et al. | 363/16 |
| 2009/0058389 A1 | * | 3/2009 | Yang et al. | 323/301 |

* cited by examiner

*Primary Examiner* — Adolf Berhane
*Assistant Examiner* — Afework Demisse
(74) *Attorney, Agent, or Firm* — McClure, Qualey & Rodack, LLP

(57) ABSTRACT

The present invention provides a correction circuit for a power converter. The correction circuit includes a sampling circuit, a demagnetizing-time circuit, a duty circuit, and a compensation circuit. The sampling circuit generates an average-current signal in response to a switching current of the power converter. The demagnetizing-time circuit generates a discharging-time signal in response to a switching signal and an input-voltage signal. The duty circuit generates a duty signal in response to the discharging-time signal, an on-time of the switching signal, and a switching period of the switching signal. The compensation circuit is coupled to receive the average-current signal and the duty signal for generating a corrected signal. The switching signal is utilized to switch a magnetic device for regulating an output voltage of the power converter. The corrected signal is coupled to generate the switching signal.

18 Claims, 11 Drawing Sheets

CORRECTION CIRCUIT OF A SWITCHING-CURRENT SAMPLE FOR POWER CONVERTERS IN BOTH CCM AND DCM OPERATION

CROSS REFERENCE TO RELATED APPLICATIONS

This application claims the benefit of U.S. Provisional Application No. 61/383,484, filed on Sep. 16, 2010, the contents of which are incorporated herein by reference.

BACKGROUND OF THE INVENTION

1. Field of the Invention

The present invention generally relates to power converters, and, more specifically, the present invention relates to boost power converters.

2. Description of the Related Art

FIG. 1 shows a conventional PFC (power factor correction) power converter, which is embodied in boost topology. The PFC power converter comprises a bridge rectifier 10, a magnetic device 15, a controller 90, a power switch 20, a rectifier 40, a capacitor 50, a line resistor 35, a current-sensing resistor 25, and a voltage divider. The controller 90 comprises a line terminal LN, an output terminal SW, a feedback terminal FB, a sensing terminal VN, and a ground terminal GND. The bridge rectifier 10 rectifies an AC line voltage $V_{AC}$ into an input voltage $V_{IN}$. The magnetic device 15, which is an inductor for example, is connected between an output of the bridge rectifier 10 and an anode of the rectifier 40. A first terminal of the power switch 20 is connected to the anode of the rectifier 40. A second terminal of the power switch 20 is connected to a ground reference. The line resistor 35 is coupled to detect the input voltage $V_{IN}$ for providing an input-voltage signal $I_{AC}$ to the line terminal LN of the controller 90. The capacitor 50 is connected between a cathode of the rectifier 40 and the ground reference. The controller 90 generates a switching signal $S_W$ via its output terminal SW to a control terminal of the power switch 20 for generating an output voltage $V_O$, which is obtained across the capacitor 50. The voltage divider formed by resistors 71 and 72 is connected in parallel with the capacitor 50. A joint of the resistors 71 and 72 provides a feedback signal $V_{FB}$, which is proportional to the output voltage $V_O$, to the feedback terminal FB of the controller 90. The current-sensing resistor 25 is connected between the second terminal of the power switch 20 and the sensing terminal VN of the controller 90. Referring to FIG. 1, as the power switch 20 is turned on, a switching current $I_L$ of the magnetic device 15 will be equal to a charging current $I_W$ flowing via the power switch 20 and return to the bridge rectifier 10 via the current-sensing resistor 25 (charging path). As the power switch 20 is turned off, since the polarity of the magnetic device 15 reverses, the switching current $I_L$ will be equal to a discharging current $I_{DS}$ flowing via the rectifier 40 and return to the bridge rectifier 10 via the current-sensing resistor 25 (discharging path). The current-sensing resistor 25 is coupled to sense the switching current $I_L$ of the magnetic device 15. Since the current-sensing resistor 25 is connected via both the charging path and the discharging path of the magnetic device 15, the switching current $I_L$ sensed by the current-sensing resistor 25 can be calculated as a switching current average. As a result, the technique used in the circuit schematic of FIG. 1 is the well known "average-current control technique". However, the drawback of PFC power converters utilizing this technique is higher power consumption across the current-sensing resistor 25. Furthermore, these PFC power converters also fail to be connected in parallel to achieve higher efficiency, such as the solution shown in an U.S. Pat. No. 7,626,372 titled "Control Circuit for Multi-phase, Multi-channels PFC Converter with Variable Switching Frequency".

BRIEF SUMMARY OF THE INVENTION

The present invention provides a method and apparatus for correcting the switching current sample of a boost power converter operated in a CCM (continuous current mode) and a DCM (discontinuous current mode).

The present invention provides a correction circuit for a power converter. The correction circuit comprises a sampling circuit, a demagnetizing-time circuit, a duty circuit, and a compensation circuit. The sampling circuit generates an average-current signal in response to a switching current of the power converter. The demagnetizing-time circuit generates a discharging-time signal in response to a switching signal and an input-voltage signal. The duty circuit generates a duty signal in response to the discharging-time signal, an on-time of the switching signal, and a switching period of the switching signal. The compensation circuit is coupled to receive the average-current signal and the duty signal for generating a corrected signal. The switching signal is utilized to switch a magnetic device for regulating an output voltage of the power converter. The discharging-time signal is correlated to a demagnetizing time of the magnetic device. The input-voltage signal is correlated to an input voltage of the magnetic device. The corrected signal is coupled to generate the switching signal.

The average-current signal is generated in response to the switching current in a CCM (continuous current mode) operation. The duty signal is coupled to correct the average-current signal for generating the corrected signal when the switching current is operated in a DCM (discontinuous current mode). A maximum value of the corrected signal is equal to the average-current signal. The output voltage of the power converter is coupled to the demagnetizing-time circuit to generate the discharging-time signal. The correction circuit also comprises a period-time circuit generating a period signal in response to the switching period of the switching signal. The period signal is coupled to the duty circuit for generating the duty signal. The duty circuit comprises an available-time circuit generating an available signal in response to the on-time of the switching signal and the discharging-time signal.

The duty circuit further comprises a duty-time circuit. The duty-time circuit comprises a capacitor, a current-source circuit, and a comparator. The current-source circuit generates a charging current in response to the period signal. The charging current charges the capacitor for generating a ramp signal. The comparator is coupled to receive the ramp signal and the available signal for generating the duty signal. The power converter is a boost power converter.

The present invention also provides a method of correcting a switching-current sample for a power converter. The method comprises: generating a discharging-time signal in response to a switching signal and an input-voltage signal; generating a duty signal in response to the discharging-time signal, an on-time of the switching signal, and a switching period of the switching signal; and generating a corrected signal in response to an average-current signal and the duty signal. The switching signal is utilized to switch a magnetic device for regulating an output voltage of the power converter. The discharging-time signal is correlated to a demagnetizing time of the magnetic device. The input-voltage signal is correlated to an input voltage of the magnetic device. The average-current signal is generated in response to a switching current of the power converter. The corrected signal is coupled to generate the switching signal.

The average-current signal is generated in response to the switching current in a CCM (continuous current mode) operation. The duty signal is coupled to correct the average-current signal which is the switching-current sample for generating the corrected signal when the switching current is in a DCM (discontinuous current mode) operation. A maximum value of the corrected signal is equal to the average-current signal. The output voltage of the power converter is coupled to generate the discharging-time signal. The method further comprises generating a period signal in response to the switching period of the switching signal. The period signal is utilized to generate the duty signal. The power converter is a boost power converter.

The present invention also provides an apparatus for correcting a switching-current sample of a power converter. The apparatus comprises a demagnetizing-time circuit, a duty circuit, and a compensation circuit. The demagnetizing-time circuit generates a discharging-time signal in response to a switching signal and an input-voltage signal. The duty circuit generates a duty signal in response to the discharging-time signal and the switching signal. The compensation circuit is coupled to receive an average-current signal and the duty signal for generating a corrected signal. The switching signal is utilized to switch a magnetic device of the power converter. The discharging-time signal is correlated to a demagnetizing time of the magnetic device. The input-voltage signal is obtained via a resistor coupled to an input voltage of the magnetic device. The average-current signal is generated in response to a switching current of the power converter. The corrected signal is coupled to generate the switching signal.

The average-current signal is generated in response to the switching current in a CCM (continuous current mode) operation. The duty signal is coupled to correct the average-current signal for generating the corrected signal when the switching current is in a DCM (discontinuous current mode) operation. A maximum value of the corrected signal is equal to the average-current signal.

The present invention further provides an apparatus for correcting a switching-current sample of a power converter. The circuit comprises a detection circuit, a duty circuit, a compensation circuit. The detection circuit is coupled to an auxiliary winding of a magnetic device of the power converter for generating a discharging-time signal. The duty circuit generates a duty signal in response to the discharging-time signal and a switching signal. The compensation circuit is coupled to receive an average-current signal and the duty signal for generating a corrected signal. The switching signal is utilized to switch the magnetic device. The discharging-time signal is correlated to a demagnetizing time of the magnetic device. The average-current signal is generated in response to a switching current of the power converter. The corrected signal is coupled to generate the switching signal.

The average-current is generated in response to the switching current in a CCM (continuous current mode) operation. The duty signal is coupled to correct the average-current signal for generating the corrected signal when the switching current is in a DCM (discontinuous current mode) operation. A maximum value of the corrected signal is equal to the average-current signal. The power converter is a boost power converter.

It is an object of the present invention to correct the switching-current sample of a power converter in a DCM operation.

It is also an object of the present invention to achieve high efficiency by connecting PFC converters in parallel with precise average-current control.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sensing. The scope of the invention is best determined by reference to the appended claims.

Figure 1:
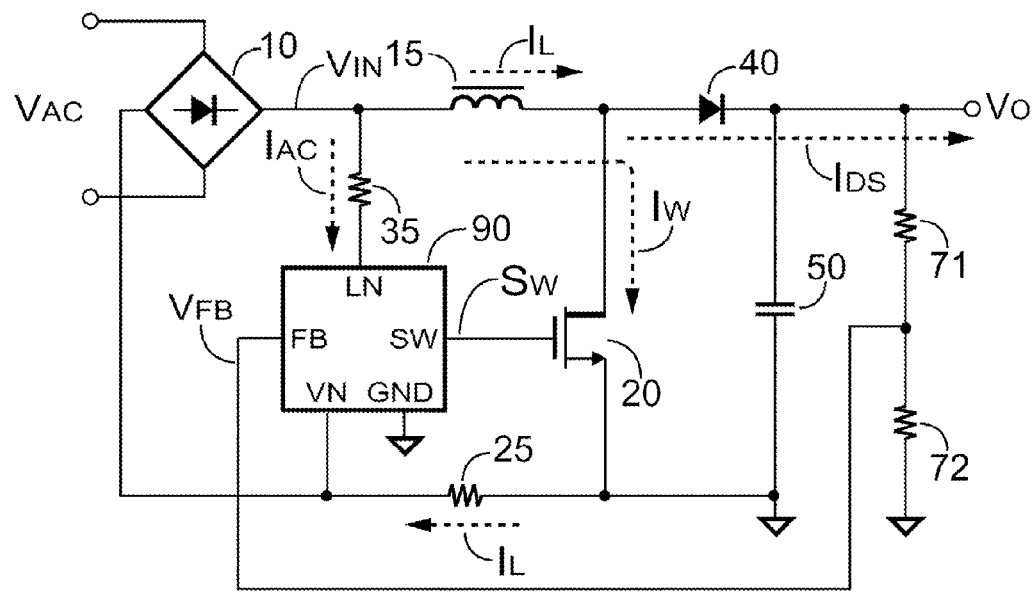
FIG. 1 shows a conventional PFC power converter.
Figure 2:
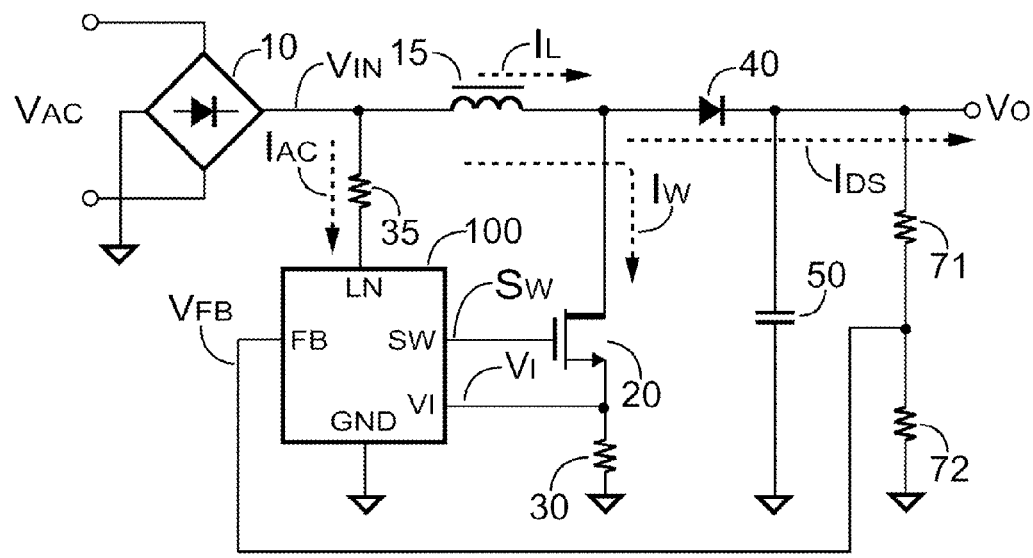
FIG. 2 shows an embodiment of a PFC power converter according to the present invention.

FIG. 2 shows an embodiment of a PFC (power factor correction) power converter according to the present invention. In the embodiment, the PFC power converter is implemented by a boost power converter. The PFC power converter comprises a bridge rectifier 10, a magnetic device 15, a controller 100, a power switch 20, a rectifier 40, a capacitor 50, a line resistor 35, a current-sensing resistor 30 and a voltage divider. The controller 100 is also referred to a correction circuit and comprises a line terminal LN, an output terminal SW, a feedback terminal FB, a sensing terminal VI, and a ground terminal GND. The bridge rectifier 10 rectifies an AC line voltage $V_{AC}$ into an input voltage $V_{IN}$. The magnetic device 15, which is an inductor in one embodiment of the present invention, is connected between an output of the bridge rectifier 10 and an anode of the rectifier 40. A first terminal of the power switch 20 is connected to the anode of the rectifier 40. A second terminal of the power switch 20 is connected to a ground reference via the current-sensing resistor 30. The line resistor 35 is coupled to detect the input voltage $V_{IN}$ for providing an input-voltage signal $I_{AC}$ to the line terminal LN of the controller 100. The input-voltage signal $I_{AC}$ is correlated to the input voltage $V_{IN}$. The capacitor 50 is connected between a cathode of the rectifier 40 and the ground reference. The controller 100 generates a switching signal $S_W$ via its output terminal SW to control the power switch 20. The switching signal $S_W$ is utilized to switch the magnetic device 15 for regulating an output voltage $V_O$ of the PFC power converter. The output voltage $V_O$ is obtained across the capacitor 50. The voltage divider formed by resistors 71 and 72 is connected in parallel with the capacitor 50. A joint of the resistors 71 and 72 provides a feedback signal $V_{FB}$, which is proportional to the output voltage $V_O$, to the feedback terminal FB of the controller 100. The current-sensing resistor 30 is connected between the second terminal of the power switch 20 and the ground reference. Different to the prior art in FIG. 1, the current-sensing resistor 30 is only connected via a charging path for sampling a charging current $I_W$ flowing via the power switch 20 for generating a current-sensing signal $V_I$. The charging current $I_W$ is used to charge the magnetic device 15; therefore, it is also a charging current thereof. Since the current-sensing resistor 30 is only connected via the charging path of the magnetic device 15, the switching current sampling is accurate in a CCM (continuous current mode) operation but not accurate in a DCM (discontinuous current mode) operation. Therefore, it is required to make an error correction in the DCM operation.

Figure 3:
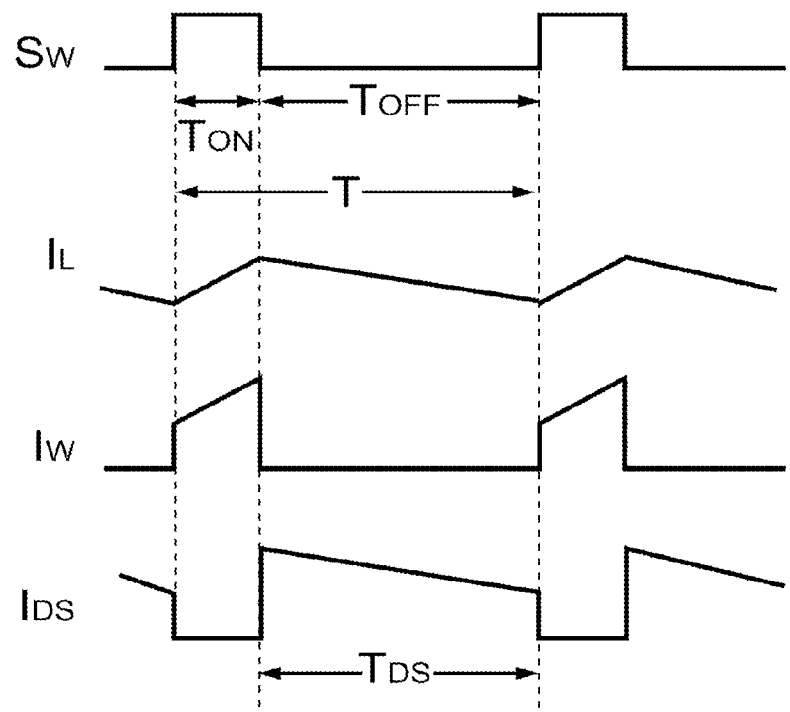
FIG. 3 shows waveforms of a switching signal, a switching current, a charging current, and a discharging current in a CCM operation.
Figure 4:
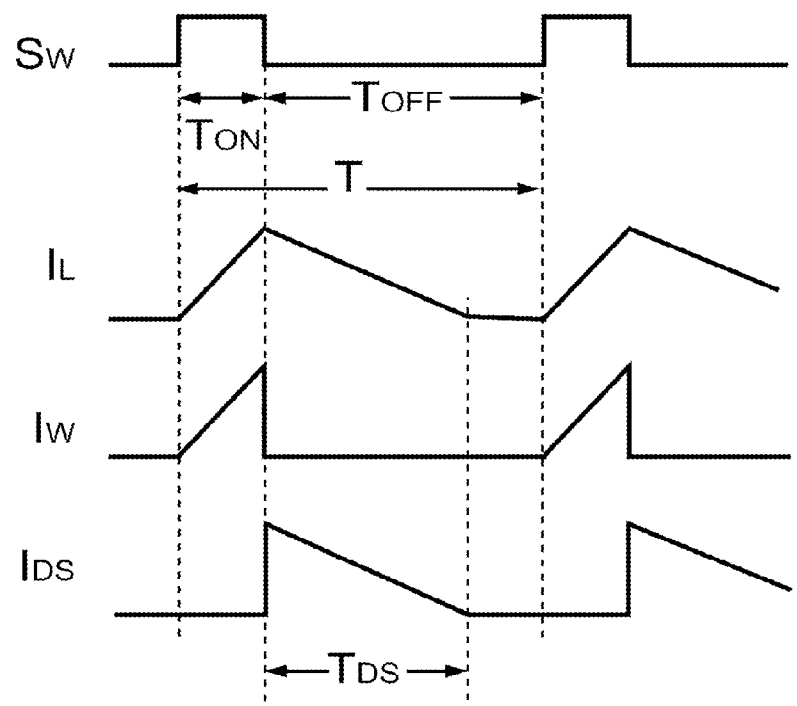
FIG. 4 shows waveforms of the switching signal, the switching current, a charging current, and the discharging current in a DCM operation.

FIG. 3 shows the waveforms of the switching signal $S_W$, the switching current $I_L$, the charging current $I_W$, and a discharging current $I_{DS}$ in a CCM operation. FIG. 4 shows the waveforms of the switching signal $S_W$, the switching current $I_L$, the charging current $I_W$, and the discharging current $I_{DS}$ in a DCM operation. The power switch 20 is turned on during an on-time $T_{ON}$ of the switching signal $S_W$. The charging current $I_W$ is available only during the on-time $T_{ON}$ of the switching signal $S_W$. The switching current $I_L$ is the current flowing via the magnetic device 15, including the charging current $I_W$ while the power switch 20 is being turned on and the discharging current $I_{DS}$ while the power switch 20 is being turned off The discharging current $I_{DS}$ is available during a demagnetizing time (discharging time $T_{DS}$) of the magnetic device 15, which is equal to an off-time $T_{OFF}$ of the switching signal $S_W$ in the CCM operation. T is the switching period of the switching signal $S_W$. As shown in FIG. 3, the switching signal $S_W$ is enabled before the switching current $I_L$ is discharged to zero in the CCM operation. The switching current $I_L$ is continuous (not discharged to zero) in the switching cycle, and, thus, the average of the switching current $I_L$ can be sampled via the current-sensing resistor 30. As shown in FIG. 4, the switching signal $S_W$ is enabled after the switching current $I_L$ is discharged to zero in the DCM operation. The switching current $I_L$ is discontinuous (discharged to zero) in the switching cycle. A duty cycle D.C. of the switching current $I_L$ can be expressed as following equation:

$$D.C. = \frac{(T_{ON} + T_{DS})}{T} \quad (1)$$

where the duty cycle D.C. of the switching current $I_L$ is equal to 1 in the CCM operation and is lower than 1 in the DCM operation.

Referring to FIG. 3, FIG. 4, and equation (1), the discharging times $T_{DS}$ in the DCM and CCM operations are different, and the current-sensing resistor 30 connected at the charging path of the magnetic device 15 fails to sample the discharging current $I_{DS}$ to know the discharging time $T_{DS}$. Thus, the information of the duty cycle D.C. of the switching current $I_L$ will be incomplete to calculate the average of the switching current $I_L$ and get a switching-current sample error in the DCM operation, which becomes the main issue to be solved by the present invention.

Figure 5:
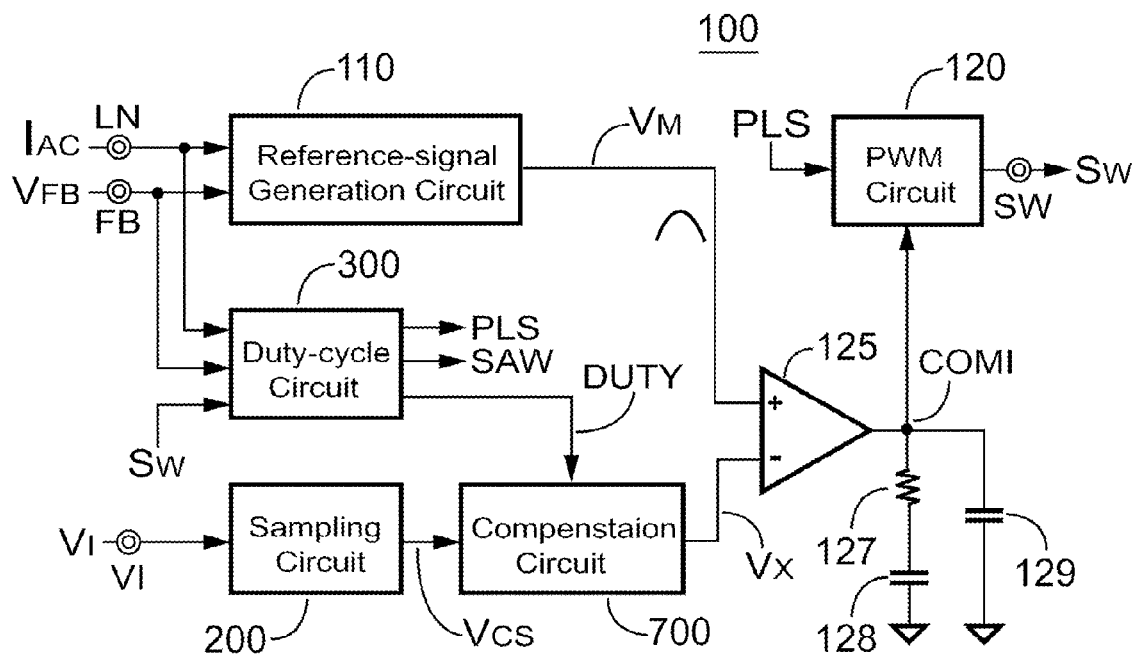
FIG. 5 shows an embodiment of a controller of the PFC power converter in FIG. 2.

FIG. 5 shows an embodiment of the controller 100 according to the present invention. The controller 100 comprises a reference-signal generation circuit 110, a duty-cycle circuit 300, a sampling circuit 200, a compensation circuit 700, a PWM circuit 120, an error amplifier 125, and a low-pass filter. The reference-signal generation circuit 110 is coupled to the line terminal LN and feedback terminal FB for respectively receiving the input-voltage signal $I_{AC}$ and the feedback signal $V_{FB}$. The duty-cycle circuit 300 receives the input-voltage signal $I_{AC}$, the feedback signal $V_{FB}$, and the switching signal $S_W$ for generating a duty signal DUTY. The duty-cycle circuit 300 further provides a pulse signal PLS and a saw-tooth signal SAW. The pulse signal PLS is coupled to enable the switching signal $S_W$ and provide a dead time for the switching signal $S_W$. That is, the switching signal $S_W$ is disabled during an enabled period of the pulse signal PLS. In response to the current-sensing signal $V_I$, the sampling circuit 200 generates an average-current signal $V_{CS}$, which is also a switching-current sample. In response to the duty signal DUTY, the compensation circuit 700 corrects the average-current signal $V_{CS}$ to generate a corrected signal $V_X$ when the charging current $I_W$ is operated in the DCM operation. The maximum value of the corrected signal $V_X$ is equal to the average-current signal $V_{CS}$. The corrected signal $V_X$ can be expressed by following equation:

$$V_X = V_{CS} \times \text{DUTY} = V_{CS} \times \frac{(T_{ON} + T_{DS})}{T} \quad (2)$$

A positive terminal of the error amplifier 125 receives a reference signal $V_M$. A negative terminal of the error amplifier 125 receives the corrected signal $V_X$. A resistor 127 and capacitors 128 and 129 form a low-pass filter for loop compensation of the PFC power converter. The resistor 127 is connected in series with the capacitor 128 between an output terminal of the error amplifier 125 and the ground reference. The capacitor 129 is connected between the output terminal of the error amplifier 125 and the ground reference. The output terminal of the error amplifier 125 generates a compensation signal COMI in response to the reference signal $V_M$ and the corrected signal $V_X$. The PWM circuit 120 generates the switching signal $S_W$ in response to the pulse signal PLS and the compensation signal COMI. The waveform of the reference signal $V_M$ follows that of the input-voltage signal $I_{AC}$, which is a positive sinusoid in one embodiment of the present invention.

Figure 6:
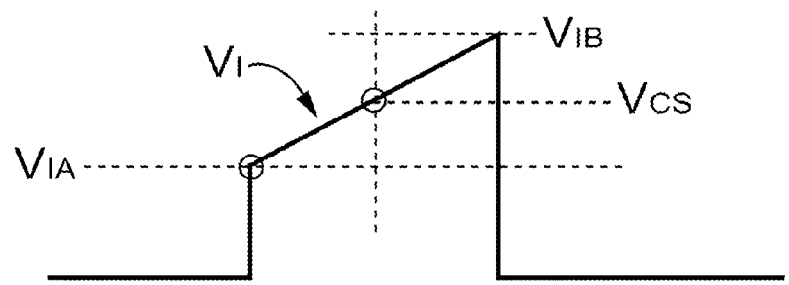
FIG. 6 shows a waveform of a current-sensing signal and relationship between the current-sensing signal and the average-current signal.

FIG. 6 shows the waveform of the current-sensing signal $V_I$ and the relationship between the current-sensing signal $V_I$ and the average-current signal $V_{CS}$ in the CCM operation. The current-sensing signal $V_I$ is generated across the current-sensing resistor 30 in response to the charging current $I_W$ of the power switch 20.

$$V_{CS} = \frac{V_{IA} + V_{IB}}{2} \quad (3)$$

where $V_{IA}$ is an initial value of the current-sensing signal $V_I$ at the beginning of each switching cycle in the CCM operation; $V_{IB}$ is a peak value of the current-sensing signal $V_I$; and $V_{CS}$ is the average-current signal.

Figure 7:
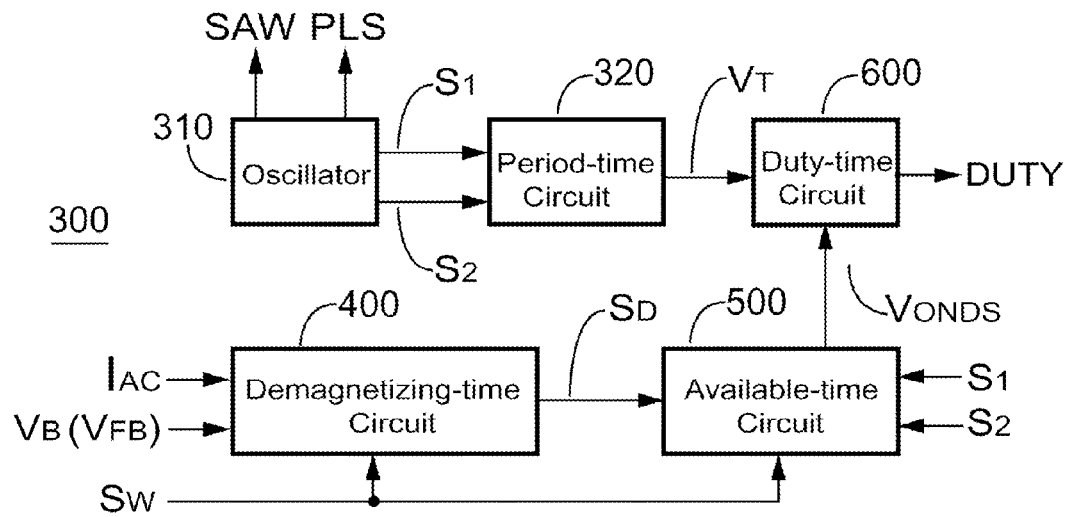
FIG. 7 shows an embodiment of a duty-cycle circuit of the controller in FIG. 5.

FIG. 7 shows an embodiment of the duty-cycle circuit 300 of the controller 100 according to the present invention. The duty-cycle circuit 300 comprises an oscillator 310, a period-time circuit 320, a demagnetizing-time circuit 400, and a duty circuit. The oscillator 310 generates the pulse signal PLS, the saw-tooth signal SAW, a sampling signal $S_1$, and a clearing signal $S_2$. The period-time circuit 320 generates a period signal $V_T$ in response to the sampling signal $S_1$ and the clearing signal $S_2$. The demagnetizing-time circuit 400 receives the switching signal $S_W$, the input-voltage signal $I_{AC}$, and a signal $V_B$ to generate a discharging-time signal $S_D$. The discharging-time signal $S_D$ is correlated to the discharging time $T_{DS}$ of the magnetic device 15. The signal $V_B$ can be proportional to the feedback signal $V_{FB}$ or simply a reference signal. The duty circuit generates the duty signal DUTY in response to the discharging-time signal $S_D$, the on-time $T_{ON}$ of the switching signal $S_W$, and the switching period T of the switching signal $S_W$. The duty circuit comprises an available-time circuit 500 and the duty-time circuit 600. The available-time circuit 500 generates an available signal $V_{ONDS}$ in response to the discharging-time signal $S_D$ and the on-time ($T_{ON}$) of the switching signal $S_W$. The amplitude of the available signal $V_{ONDS}$ is correlated to a summed duration $T_{ONDS}$ of the on-time ($T_{ON}$) of the switching signal $S_W$ and the discharging time $T_{DS}$. The duty-time circuit 600 generates the duty signal DUTY in response to the period signal $V_T$ and the available signal $V_{ONDS}$.

Figure 8:
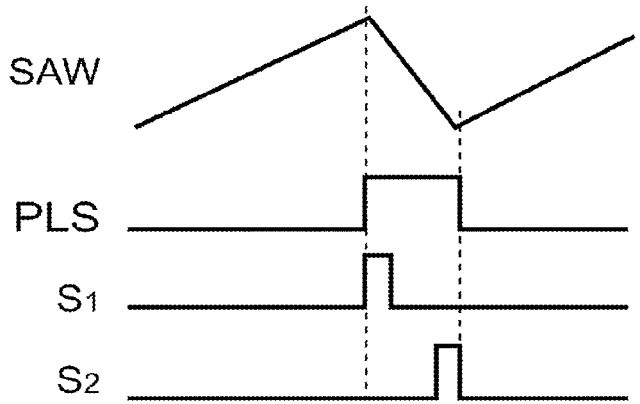
FIG. 8 shows waveforms of a saw-tooth signal, a pulse signal, a sampling signal, and a clearing signal.

FIG. 8 shows waveforms of the saw-tooth signal SAW, the pulse signal PLS, the sampling signal $S_1$, and the clearing signal $S_2$.

Figure 9:
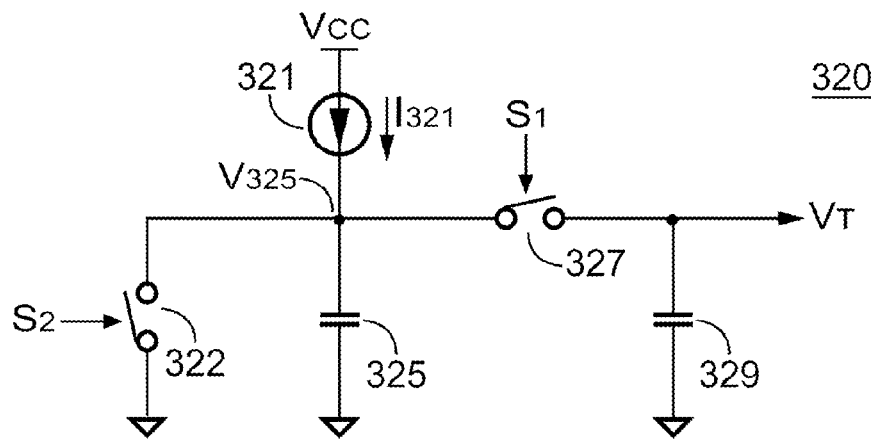
FIG. 9 shows an embodiment of a period-time circuit of the duty-cycle circuit according to the present invention.

FIG. 9 shows an embodiment of the period-time circuit 320 according to the present invention. The period-time circuit 320 comprises switches 322 and 327, capacitors 325 and 329, and a current source 321. The current source 321 can be simply embodied with a voltage-to-current converter having an input supplied with a supply voltage $V_{CC}$ and an output generating a current $I_{321}$. The capacitor 325 is connected between the current source 321 and the ground reference. The switch 322 is connected in parallel with the capacitor 325. A control terminal of the switch 322 is supplied with the clearing signal $S_2$. The switch 327 and the capacitor 329 are connected in series between the current source 321 and the ground reference. A control terminal of the switch 327 is supplied with the sampling signal $S_1$. The period signal $V_T$ is obtained across the capacitor 329. Once the clearing signal $S_2$ is disabled, the current source 321 will start to charge the capacitor 325. When the sampling signal $S_1$ is enabled, a voltage $V_{325}$ across the capacitor 325 will be conducted to the capacitor 329 for generating the period-time signal $V_T$. The period-time circuit 320 generates the period signal $V_T$ in response to the sampling signal $S_1$ and the clearing signal $S_2$. Since a period starting at the leading-edge of the clearing signal $S_2$ and ending at the leading-edge of the sampling signal $S_1$ is approximately equal to the switching period T of the switching signal $S_W$, an amplitude of the period signal $V_T$ will be correlated to the switching period T of the switching signal $S_W$.

Figure 10:
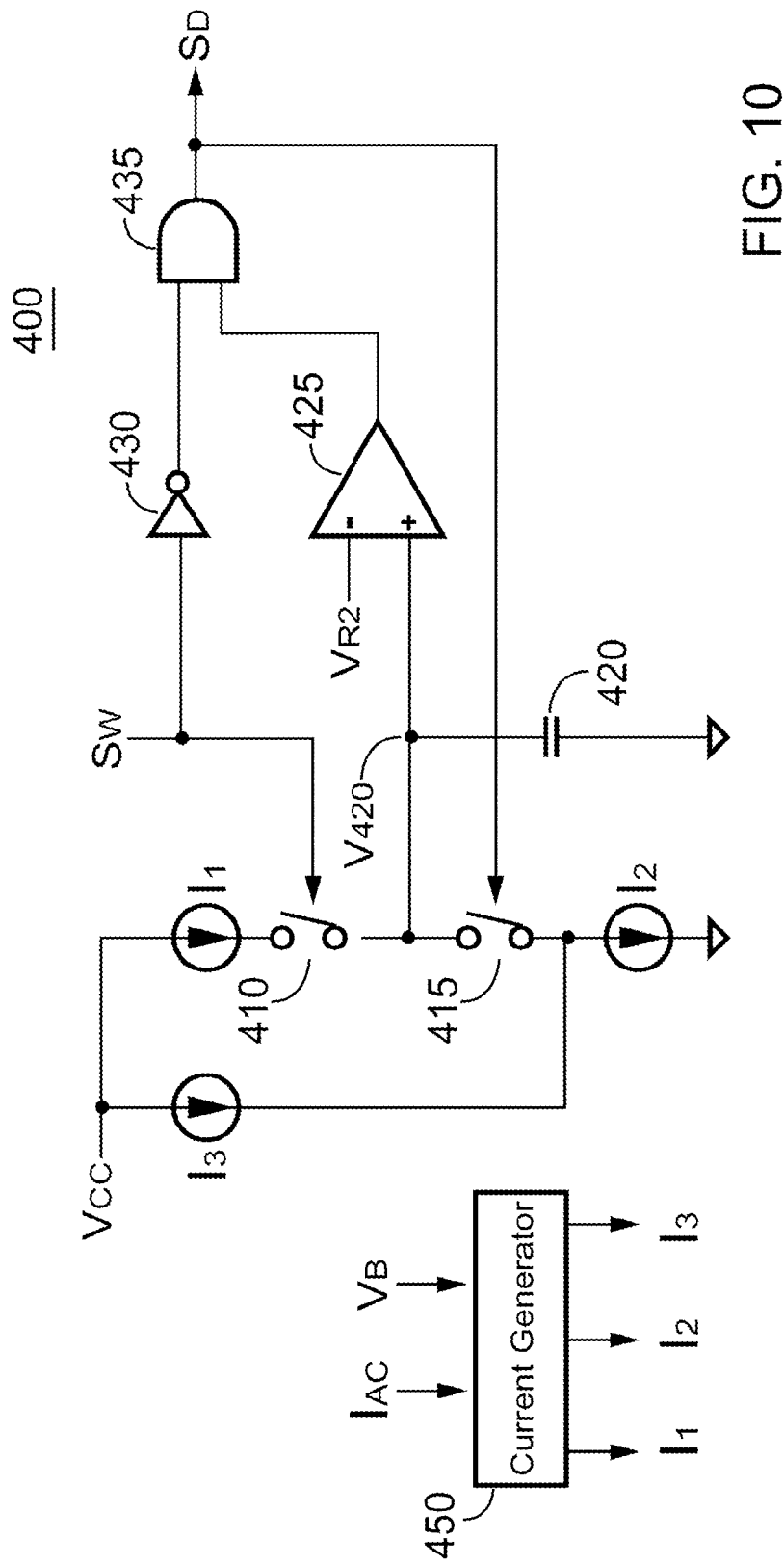
FIG. 10 shows an embodiment of a demagnetizing-time circuit of the duty-cycle circuit according to the present invention.

FIG. 10 shows an embodiment of the demagnetizing-time circuit 400 according to the present invention. The detail operation of the demagnetizing-time circuit 400 can be found in a prior art "Method and apparatus for detecting demagnetizing time of magnetic device", U.S. Pat. No. 7,471,523. The demagnetizing-time circuit 400 comprises a current generator 450, switches 410 and 415, a capacitor 420, an inverter 430, a comparator 425, and an AND gate 435. The current generator 450 generates a first current $I_1$, a second current $I_2$, and a third current $I_3$ in response to the signal $V_B$ and the input-voltage signal $I_{AC}$. The signal $V_B$ is correlated to the feedback signal $V_{FB}$, which is also correlated to the output voltage $V_O$. The signal $V_B$ can also be a reference signal. The input-voltage signal $I_{AC}$ is correlated to the input voltage $V_{IN}$. A first terminal of the switch 410 receives the first current $I_1$. A second terminal of the switch 410 is connected to a first terminal of the switch 415. A second terminal of the switch 415 is connected to the ground reference. The capacitor 420 is connected to a joint of the switches 410 and 415. A voltage $V_{420}$ is generated across the capacitor 420. A positive terminal of the comparator 425 receives the voltage $V_{420}$. A negative terminal of the comparator 425 receives a reference voltage $V_{R2}$. The switching signal $S_W$ is supplied to a control terminal of the switch 410 and an input of the inverter 430. An output of the inverter 430 and an output of the comparator 425 are respectively connected to two inputs of the AND gate 435. An output of the AND gate 435 generates the discharging-time signal $S_D$, which is also supplied to a control terminal of the switch 415. Once the switching signal $S_W$ is enabled, the first current $I_1$ start to charge the capacitor 420. While the voltage $V_{420}$ is greater than the reference voltage $V_{R2}$ and the switching signal $S_W$ is being disabled, the discharging-time signal $S_D$ will be enabled. This enabled discharging-time signal $S_D$ will turn on the switch 415. The third current $I_3$ is coupled to the second current $I_2$ for discharging the capacitor 420. Once the voltage $V_{420}$ is lower than the reference voltage $V_{R2}$, the discharging-time signal $S_D$ will be disabled again. Since the signal $V_B$ is correlated to the output voltage $V_O$ of the PFC power converter, the demagnetizing-time circuit 400 therefore generates the discharging-time signal $S_D$ in response to the output voltage $V_O$ of the PFC power converter. The discharging-time signal $S_D$ is correlated to the discharging time $T_{DS}$. The discharging time $T_{DS}$ of the magnetic device 15 can be expressed by following equation:

$$T_{DS} = T_{ON} \times k \times \frac{V_{IN}}{(V_O - V_{IN})} \quad (4)$$

where k is a constant.

Figure 11:
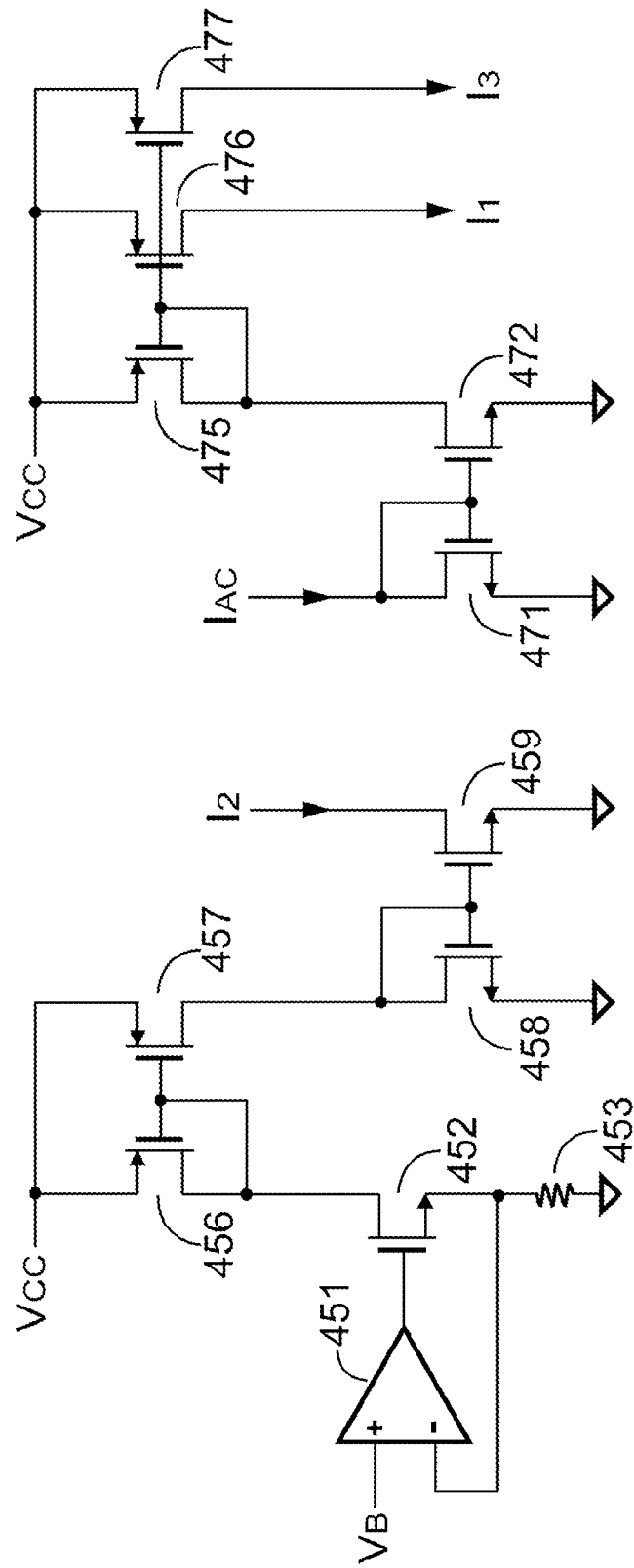
FIG. 11 shows an embodiment of a current generator of the demagnetizing-time circuit according to the present invention.

FIG. 11 shows an embodiment of the current generator 450 according to the present invention. The current generator 450 basically comprises a voltage-to-current converter and current mirrors to respectively generate the first current $I_1$ and the third current $I_3$ in response to the input-voltage signal $I_{AC}$ and generate the second current $I_2$ in response to the signal $V_B$. The voltage-to-current converter comprises an operational amplifier 451, a transistor 452, and a resistor 453. Transistors 456-459, 471-472, and 475-477 form the current mirrors. The operation of the voltage-to-current converter and the current mirrors are well-known to those skilled in the art and will be omitted herein.

Figure 12:
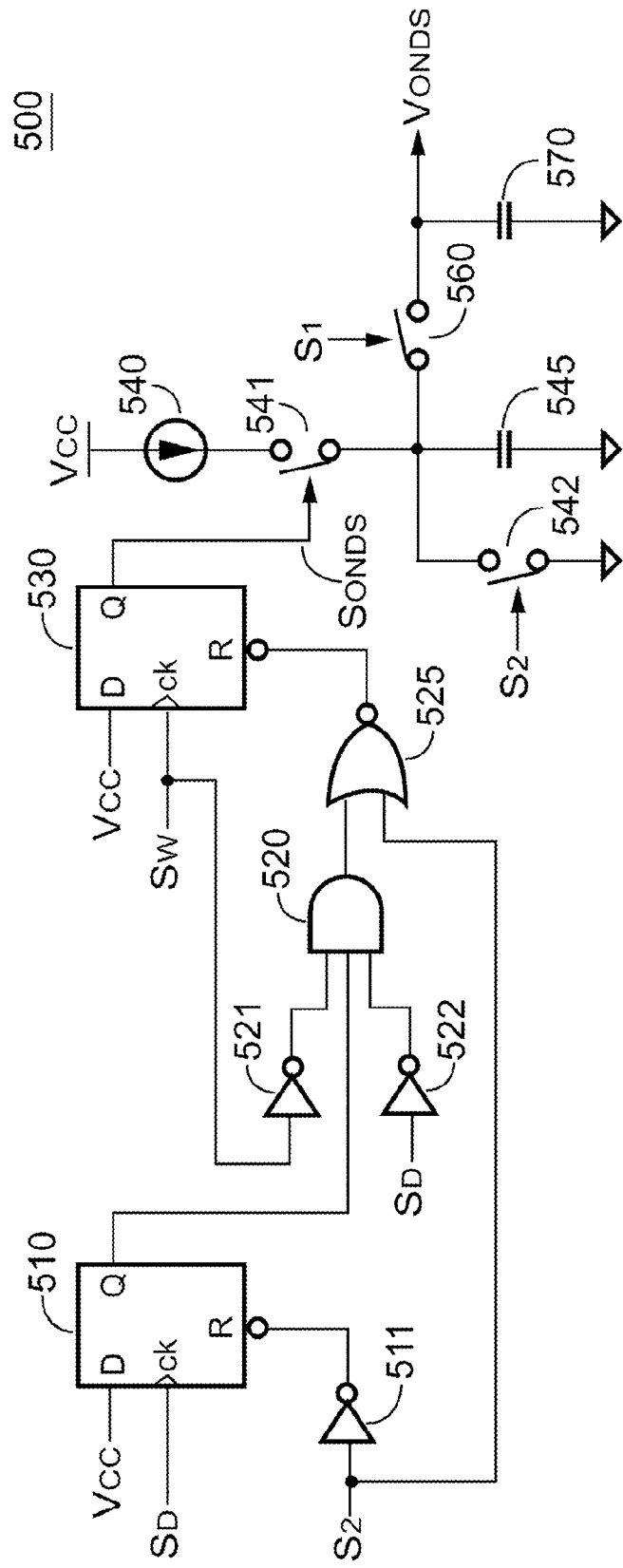
FIG. 12 shows an embodiment of an available-time circuit of the duty-cycle circuit according to the present invention.

FIG. 12 shows an embodiment of the available-time circuit 500 according to the present invention. The available-time circuit 500 comprises a time-control circuit and a sample-and-hold circuit. The time-control circuit comprises flip-flops 510 and 530, inverters 511, 521, and 522, an AND gate 520, and a NOR gate 525. The sample-and-hold circuit comprises a current source 540, switches 541, 542, and 560, and capacitors 545 and 570. The D-inputs D of the flip-flops 510 and 530 are supplied with the supply voltage $V_{CC}$. A clock-input ck of the flip-flop 510 is supplied with the discharging-time signal $S_D$. A clock-input ck of the flip-flop 530 is supplied with the switching signal $S_W$. The flip-flop 510 is reset by the clearing signal $S_2$ via the inverter 511. An output Q of the flip-flop 510 is connected to a first input of the AND gate 520. A second input of the AND gate 520 is coupled to receive the switching signal $S_W$ via the inverter 521. A third input of the AND gate 520 is coupled to receive the discharging-time signal $S_D$ via the inverter 522. An output of the AND gate 520 and the clearing signal $S_2$ are supplied to inputs of the NOR gate 525 for resetting the flip-flop 530. An output Q of the flip-flop 530 generates a time-control signal $S_{ONDS}$. The switch 541 is connected between the current source 540 and the capacitor 545. The switch 542 is coupled to the capacitor 545 in parallel. The switch 560 and the capacitor 570 are connected in series from a joint of the switch 541 and the capacitor 545 to the ground reference. The switch 542 is controlled by the clearing signal $S_2$. The switch 560 is controlled by the sampling signal $S_1$. The available signal $V_{ONDS}$ is generated across the capacitor 570. An enabled duration of the time-control signal $S_{ONDS}$ is correlated to that of the discharging-time signal $S_D$ and the switching signal $S_W$. The amplitude of the available signal $V_{ONDS}$ is correlated to the enabled duration of the time-control signal $S_{ONDS}$. As a result, the amplitude of the available signal $V_{ONDS}$ is correlated to the summed period $T_{ONDS}$ of the on-time ($T_{ON}$) of the switching signal $S_W$ and the discharging time $T_{DS}$.

Figure 13:
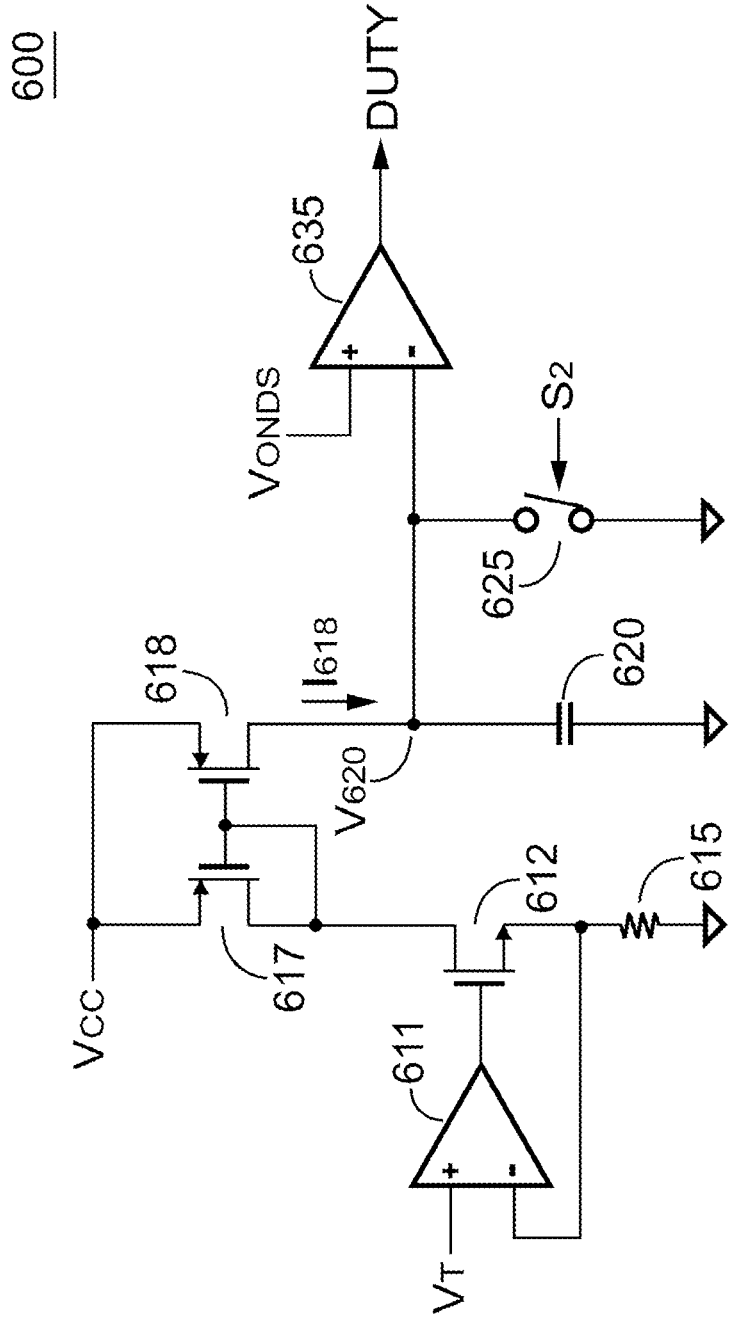
FIG. 13 shows an embodiment of a duty-time circuit of the duty-cycle circuit according to the present invention.

FIG. 13 shows an embodiment of the duty-time circuit 600 according to the present invention. The duty-time circuit 600 comprises a current-source circuit, a capacitor 620, a switch 625, and a comparator 635. The current-source circuit comprises an operational amplifier 611, transistors 612, 617, and 618, and a resistor 615. The operation of the current-source circuit is basically achieved by a voltage-to-current converter and a current mirror, which is well known to those skilled in the art and will be omitted herein. The current-source circuit generates a charging current $I_{618}$ in response to the period signal $V_T$, which is input to the aforementioned voltage-to-current converter. The capacitor 620 is coupled to an output of the current-source circuit for receiving the charging current $I_{618}$. The switch 625 is connected to the capacitor 620 in parallel and controlled by the clearing signal $S_2$. A voltage $V_{620}$ is generated across the capacitor 620. The voltage $V_{620}$ is supplied to a negative terminal of the comparator 635. A positive terminal of the comparator 635 is supplied with the available signal $V_{ONDS}$. The comparator 635 generates the duty signal DUTY by comparing the voltage $V_{620}$ and the available signal $V_{ONDS}$.

Figure 14:
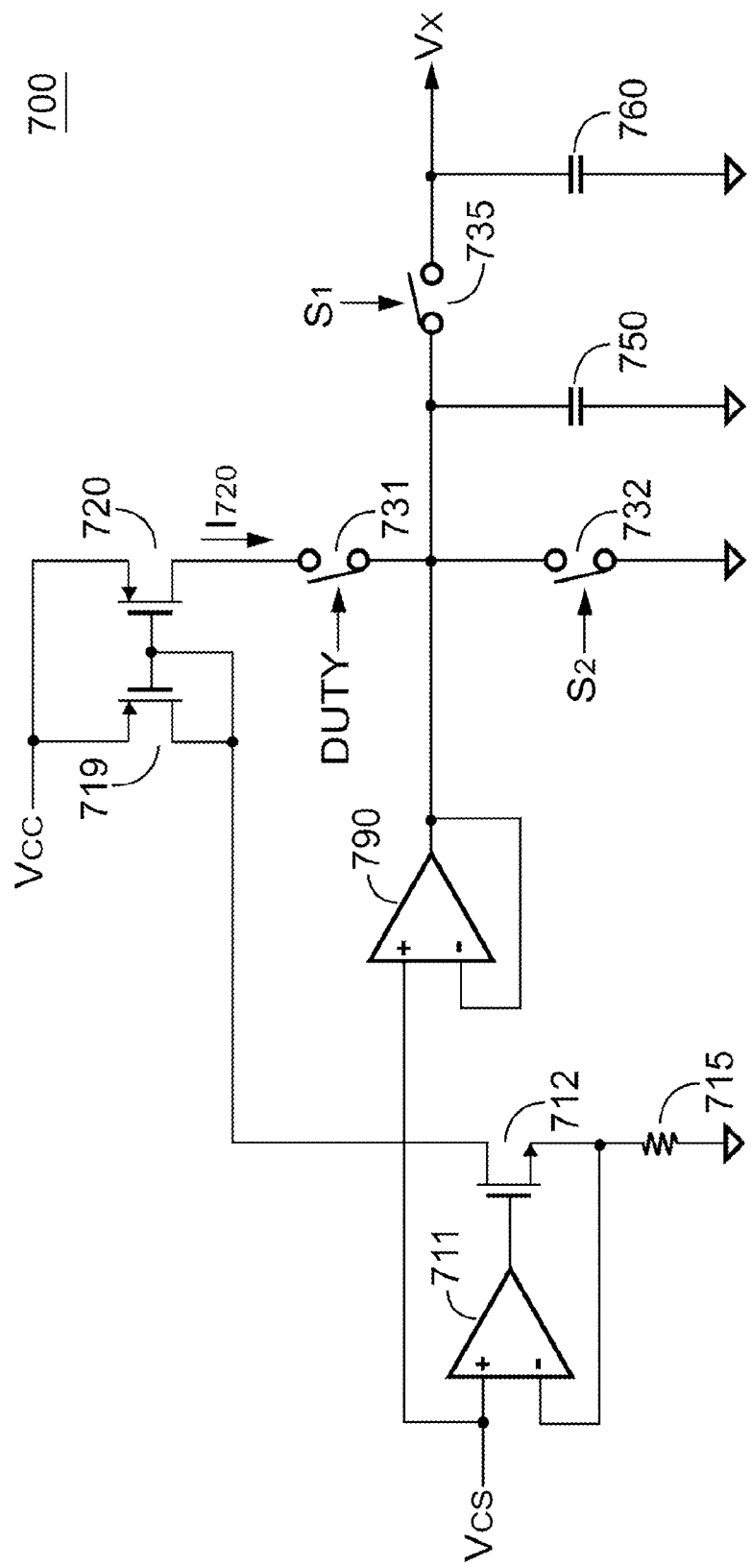
FIG. 14 shows an embodiment of a compensation circuit of the controller according to the present invention.

FIG. 14 shows an embodiment of the compensation circuit 700. The compensation circuit 700 comprises a voltage-to-current converter, a buffer amplifier 790, a current mirror, switches 731, 732, and 735, and capacitors 750 and 760. The voltage-to-current converter is formed by an operational amplifier 711, a transistor 712, and a resistor 715. The current mirror is formed by transistors 719 and 720. Same as the current-source circuit in FIG. 13, the voltage-to-current converter and the current mirror in FIG. 14 are coupled to generate a charging current $I_{720}$ in response to the average-current signal $V_{CS}$, which is input to the voltage-to-current converter in FIG. 14. A negative terminal of the buffer amplifier 790 is connected to an output thereof. A positive terminal of the buffer amplifier 790 is supplied with the average-current signal $V_{CS}$. The switch 731 and the switch 732 are connected in series between an output of the current mirror and the ground reference. The output of the buffer amplifier 790 is connected to a joint of the switch 731 and the switch 732. The switch 732 is connected in parallel with the capacitor 750. The switch 735 and the capacitor 760 are connected in series between the joint of the switch 731 and the switch 732 and the ground reference. The corrected signal $V_X$ is obtained across the capacitor 760. The switch 731 is controlled by the duty signal DUTY. The switch 735 is controlled by the sampling signal $S_1$. The switch 732 is controlled by the clearing signal $S_2$. The buffer amplifier 790 has an open-drain output for limiting the maximum amplitude of the corrected signal $V_X$ to be the same as the average-current signal $V_{CS}$.

According to the embodiments of the compensation circuit 700 of the present invention, in the CCM operation, the corrected signal $V_X$ will be equal to the average-current signal $V_{CS}$. In the DCM operation, the corrected signal $V_X$ will be generated according to the enabled period of the duty signal DUTY to correct the error of the switching-current sample.

The theory of the present invention can be found in equations (2)-(13). Referring to FIG. 2, $$V_{FB} = V_O \times \frac{R_{72}}{R_{71} + R_{72}}$$

where $R_{71}$ and $R_{72}$ are respectively the resistance of the resistors 71 and 72.

Referring to FIG. 11, $$I_2 = \left\{ \left[ V_O \times \frac{R_{72}}{R_{71} + R_{72}} \right] \div R_{453} \right\} \times k_1$$

where $k_1$ is the ratio of the current mirror formed by transistors 456 and 457; $R_{453}$ is the resistance of the resistor 453.

$$I_1 = I_{AC} \times k_2$$

where $k_2$ is the ratio of the current mirror formed by transistors 475 and 476.

$$I_3 = I_{AC} \times k_3$$

where $k_3$ is the ratio of the current mirror formed by transistors 475 and 477.

Referring to FIG. 2, $$I_{AC} = \frac{V_{IN}}{R_{35}}$$

where $R_{35}$ is the resistance of the resistor 35.

Referring to FIG. 10, $$V_{R2} = \frac{I_1 \times T_{ON}}{C_{420}} = \frac{(I_2 - I_3) \times T_{DS}}{C_{420}} \quad (5)$$

where $C_{420}$ is the capacitance of the capacitor 420.

Thus, it is obtained as, $$I_1 \times T_{ON} = (I_2 - I_3) \times T_{DS}$$

According to the above equations, it can be expressed as, $$\left(\frac{V_{IN}}{R_{35}} \times k_2\right) \times T_{ON} = \left[\left(\frac{V_O}{R_{453}} \times \frac{R_{72}}{R_{71} + R_{72}}\right) \times k_1\right] - \left(\frac{V_{IN}}{R_{35}} \times k_3\right) \times T_{DS}$$

Setting $$\frac{K_2}{R_{35}} = \left[\left(\frac{K_1}{R_{453}} \times \frac{R_{72}}{R_{71} + R_{72}}\right)\right] = \frac{K_3}{R_{35}},$$

then, it can be expressed as, $$V_{IN} \times T_{ON} = (V_O - V_{IN}) \times T_{DS}$$

and then $$T_{DS} = \frac{V_{IN}}{(V_O - V_{IN})} \times T_{ON} \quad (6)$$

Referring to FIG. 12, $$T_{ONDS} = T_{ON} + T_{DS}$$

where $T_{ONDS}$ is a summed duration of $T_{ON}$ and $T_{DS}$. Then $$V_{ONDS} = \frac{I_{540} \times T_{ONDS}}{C_{545}} = \frac{V_{REF} \times T_{ONDS}}{R_{540} \times C_{545}} = \frac{V_{REF} \times (T_{ON} + T_{DS})}{R_{540} \times C_{545}} \quad (7)$$

Referring to FIG. 9, $$V_T = \frac{I_{321} \times T}{C_{325}} = \frac{V_{REF} \times T}{R_{321} \times C_{325}} \quad (8)$$

Referring to FIG. 13, $$V_{ONDS} = \frac{I_{618} \times T_{DUTY}}{C_{620}} \quad (9)$$
$$= \frac{V_T \times k_4 \times T_{DUTY}}{R_{615} \times C_{620}}$$
$$= \frac{V_{REF} \times T}{R_{321} \times C_{325}} \times \frac{k_4 \times T_{DUTY}}{R_{615} \times C_{620}}$$

where $T_{DUTY}$ is a period of the duty signal DUTY; $k_4$ is the ratio of the current mirror formed by transistors 617 and 618; $R_{615}$ is the resistance of the resistor 615; $C_{620}$ is the capacitance of the capacitor 620; and the current $I_{321}$ is represented by $V_{REF}/R_{321}$.

According to equations (6) and (8), $$V_{ONDS} = \frac{V_{REF} \times (T_{ON} + T_{DS})}{R_{540} \times C_{545}} = \frac{V_{REF} \times T}{R_{321} \times C_{325}} \times \frac{K_4 \times T_{DUTY}}{R_{615} \times C_{620}} \quad (10)$$

Setting $$\frac{R_{321} \times C_{325}}{R_{540} \times C_{545}} = 1$$

for the equation (9), which generates the following equation:

$$T_{DUTY} = \frac{(T_{ON} + T_{DS})}{K_4 \times T} \times (R_{615} \times C_{620}) \quad (11)$$

Referring to FIG. 14, $$V_X = \frac{I_{720} \times T_{DUTY}}{C_{750}} = \frac{V_{CS} \times T_{DUTY}}{R_{715} \times C_{750}} \quad (12)$$

Substituting $T_{DUTY}$ of the equation (11) into equation (12), which generates the following equation:

$$V_X = \frac{I_{720} \times T_{DUTY}}{C_{750}} \quad (13)$$
$$= \frac{V_{CS}}{R_{715} \times C_{750}} \times \frac{(T_{ON} + T_{DS})}{k_4 \times T} \times (R_{615} \times C_{620})$$

Setting $$\frac{R_{615} \times C_{620}}{k_4 \times R_{715} \times C_{750}} = 1$$

$$\frac{R_{615} \times C_{650}}{k_4 \times R_{715} \times C_{750}} = 1$$

$$V_X = V_{CS} \times \frac{(T_{ON} + T_{DS})}{T} \quad (14)$$

As shown in equation (14), with the corrected signal $V_X$, which is correlated to the on-time $T_{ON}$ of the switching signal $S_W$, the discharging time $T_{DS}$, and the switching period T of the switching signal $S_W$, a full duty cycle information is complete. With complete information of the above parameters, the average of the switching current $I_L$ can be obtained both in the CCM and DCM operations. The problem of failing to sample the discharging current $I_{DS}$ to know the discharging time $T_{DS}$ by the current-sensing resistor 30 can be therefore solved.

Figure 15:
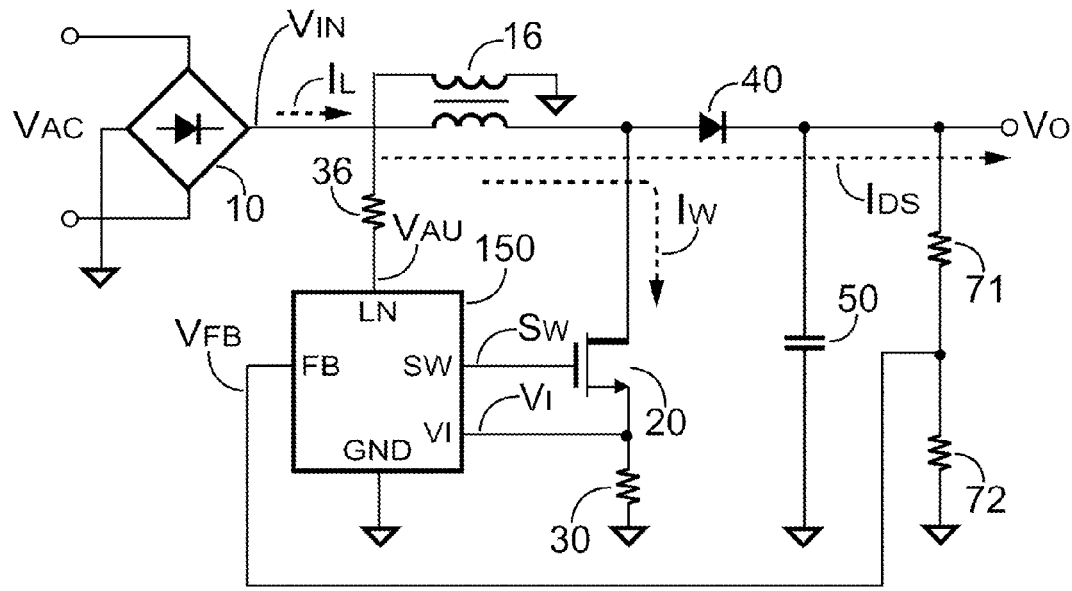
FIG. 15 shows another embodiment of a PFC power converter according to the present invention.

FIG. 15 shows another embodiment of a PFC power converter according to the present invention. Different to the embodiment in FIG. 2, an inductor 16 having an auxiliary winding is utilized to detect the demagnetizing time (the discharging time $T_{DS}$) thereof. The detail description of detecting the discharging time $T_{DS}$ can be found in the prior art "Switching Control Circuit for Discontinuous Mode PFC Converters", U.S. Pat. No. 7,116,090. A controller 150 receives an auxiliary voltage $V_{AU}$ via a line resistor 36, which is coupled from the auxiliary winding of the inductor 16 to the controller 150.

Figure 16:
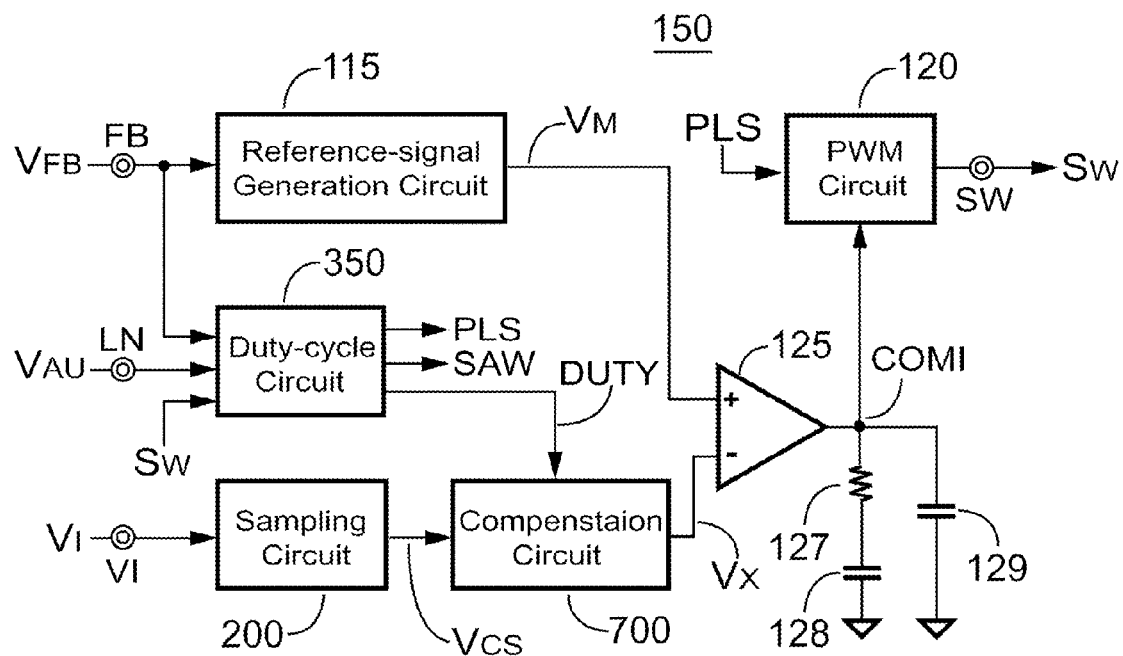
FIG. 16 shows an embodiment of a controller of the PFC power converter in FIG. 15.

FIG. 16 shows an embodiment of the controller 150. Different to the embodiment in FIG. 5, a reference-signal generation circuit 115 (functionally equivalent to the reference-signal generation circuit 110 in FIG. 5) only receives the feedback signal $V_{FB}$ to generate the reference signal $V_M$. Another difference is a duty-cycle circuit 350 (functionally equivalent to the duty-cycle circuit 300 in FIG. 5) receives the feedback signal $V_{FB}$, the auxiliary voltage $V_{AU}$, and the switching signal $S_W$ for generating the duty signal DUTY.

Figure 17:
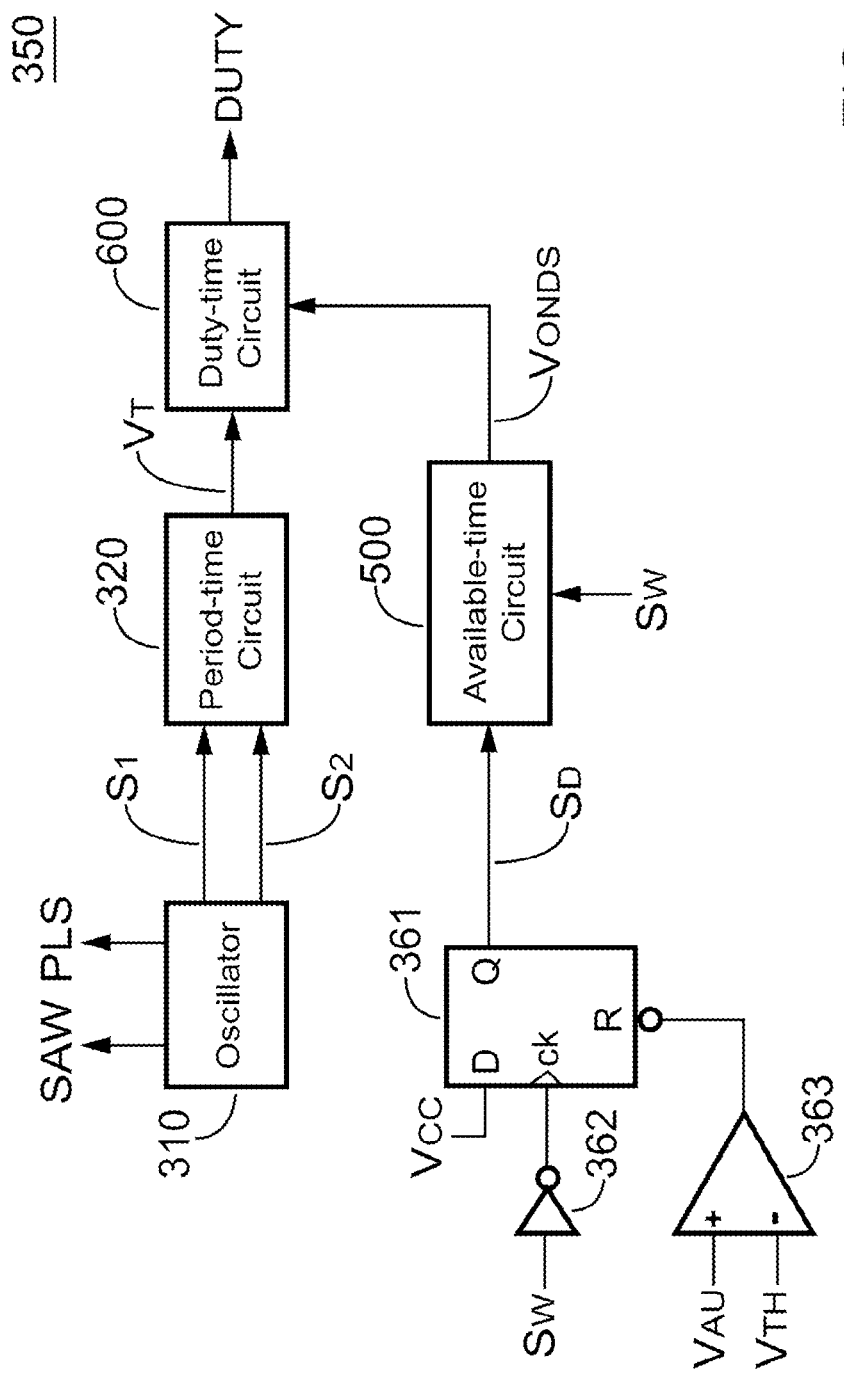
FIG. 17 shows an embodiment of a duty-cycle circuit of the controller in FIG. 16.

FIG. 17 shows an embodiment of a duty-cycle circuit 350 of the controller 150. Different to the embodiment in FIG. 7, the demagnetizing-time circuit 400 in FIG. 7 is replaced by a detection circuit. The detection circuit comprises a comparator 363, an inverter 362, and a flip-flop 361. A positive terminal of the comparator 363 receives the auxiliary voltage $V_{AU}$. A negative terminal of the comparator 363 receives a threshold voltage $V_{TH}$. A D-input D of the flip-flop 361 is supplied with the supply voltage $V_{CC}$. A clock-input ck of the flip-flop 361 is driven by the switching signal $S_W$ via the inverter 362. An output Q of the flip-flop 361 generates the discharging-time signal $S_H$. The discharging-time signal $S_D$ is disabled when the auxiliary voltage $V_{AU}$ is lower than the threshold voltage $V_{TH}$.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A correction circuit for a power converter, comprising:
a sampling circuit, generating an average-current signal in response to a switching current of said power converter;
a demagnetizing-time circuit, generating a discharging-time signal in response to a switching signal and an input-voltage signal;
a duty circuit, generating a duty signal in response to said discharging-time signal, an on-time of said switching signal, and a switching period of said switching signal; and
a compensation circuit, coupled to receive said average-current signal and said duty signal for generating a corrected signal;
wherein said switching signal is utilized to switch a magnetic device for regulating an output voltage of said power converter, said discharging-time signal is correlated to a demagnetizing time of said magnetic device, said input-voltage signal is correlated to an input voltage of said magnetic device, and said corrected signal is coupled to generate said switching signal.

2. The correction circuit as claimed in claim 1, wherein said average-current signal is generated in response to said switching current in a CCM (continuous current mode) operation.

3. The correction circuit as claimed in claim 1, wherein said duty signal is coupled to correct said average-current signal for generating said corrected signal when said switching current is operated in a DCM (discontinuous current mode), and a maximum value of said corrected signal is equal to said average-current signal.

4. The correction circuit as claimed in claim 1, wherein the output voltage of said power converter is coupled to said demagnetizing-time circuit to generate said discharging-time signal.

5. The correction circuit as claimed in claim 1 further comprising a period-time circuit generating a period signal in response to said switching period of said switching signal, wherein said period signal is coupled to said duty circuit for generating said duty signal.

6. The correction circuit as claimed in claim 1, wherein said duty circuit comprises an available-time circuit generating an available signal in response to said on-time of said switching signal and said discharging-time signal.

7. The correction circuit as claimed in claim 6, wherein said duty circuit further comprises a duty-time circuit comprising:
a capacitor;
a current-source circuit, generating a charging current in response to said period signal, wherein said charging current charges said capacitor for generating a ramp signal; and
a comparator, coupled to receive said ramp signal and said available signal for generating said duty signal.

8. The correction circuit as claimed in claim 1, wherein said power converter is a boost power converter.

9. A method of correcting a switching-current sample for a power converter, comprising:
generating a discharging-time signal in response to a switching signal and an input-voltage signal;
generating a duty signal in response to said discharging-time signal, an on-time of said switching signal, and a switching period of said switching signal; and
generating a corrected signal in response to an average-current signal and said duty signal;
wherein said switching signal is utilized to switch a magnetic device for regulating an output voltage of said power converter, said discharging-time signal is correlated to a demagnetizing time of said magnetic device, said input-voltage signal is correlated to an input voltage of said magnetic device, said average-current signal is generated in response to a switching current of said power converter, and said corrected signal is coupled to generate said switching signal.

10. The method as claimed in claim 9, wherein said average-current signal is generated in response to said switching current in a CCM (continuous current mode) operation; said duty signal is coupled to correct said average-current signal which is said switching-current sample for generating said corrected signal when said switching current is in a DCM (discontinuous current mode) operation, and a maximum value of said corrected signal is equal to said average-current signal.

11. The method as claimed in claim 9, wherein the output voltage of said power converter is coupled to generate said discharging-time signal.

12. The method as claimed in claim 9, further comprising generating a period signal in response to said switching period of said switching signal, wherein said period signal is utilized to generate said duty signal.

13. The method as claimed in claim 9, wherein said power converter is a boost power converter.

14. An apparatus for correcting a switching-current sample of a power converter, comprising:
a demagnetizing-time circuit, generating a discharging-time signal in response to a switching signal and an input-voltage signal;
a duty circuit, generating a duty signal in response to said discharging-time signal and said switching signal; and a compensation circuit, coupled to receive an average-current signal and said duty signal for generating a corrected signal;

wherein said switching signal is utilized to switch a magnetic device of said power converter, said discharging-time signal is correlated to a demagnetizing time of said magnetic device, said input-voltage signal is obtained via a resistor coupled to an input voltage of said magnetic device, said average-current signal is generated in response to a switching current of said power converter, and said corrected signal is coupled to generate said switching signal.

15. The apparatus as claimed in claim 14, wherein said average-current signal is generated in response to said switching current in a CCM (continuous current mode) operation, said duty signal is coupled to correct said average-current signal for generating said corrected signal when said switching current is in a DCM (discontinuous current mode) operation, and a maximum value of said corrected signal is equal to said average-current signal.

16. An apparatus for correcting a switching-current sample of a power converter, comprising:

a detection circuit, coupled to an auxiliary winding of a magnetic device of said power converter for generating a discharging-time signal;

a duty circuit, generating a duty signal in response to said discharging-time signal and a switching signal; and a compensation circuit, coupled to receive an average-current signal and said duty signal for generating a corrected signal;

wherein said switching signal is utilized to switch said magnetic device, said discharging-time signal is correlated to a demagnetizing time of said magnetic device, said average-current signal is generated in response to a switching current of said power converter, and said corrected signal is coupled to generate said switching signal.

17. The apparatus as claimed in claim 16, wherein said average-current is generated in response to said switching current in a CCM (continuous current mode) operation, said duty signal is coupled to correct said average-current signal for generating said corrected signal when said switching current is in a DCM (discontinuous current mode) operation, and a maximum value of said corrected signal is equal to said average-current signal.

18. The apparatus as claimed in claim 16, wherein said power converter is a boost power converter.

* * * * *